United States Patent [19]
Abdelhamid et al.

[11] Patent Number: 6,023,467
[45] Date of Patent: Feb. 8, 2000

[54] OPERATIONS AND MAINTENANCE DATA FLOWS OVER A POINT TO MULTIPOINT BROADBAND ACCESS NETWORK

[75] Inventors: Hisham Sami Abdelhamid, Stanford; Mohamed Mostafa, Menlo Park, both of Calif.

[73] Assignee: Ericsson, Inc., Menlo Park, Calif.

[21] Appl. No.: 08/848,426

[22] Filed: May 8, 1997

[51] Int. Cl.$^7$ ............ H04H 1/02; H04L 12/403; H04L 12/24
[52] U.S. Cl. ............ 370/395; 370/471; 370/486
[58] Field of Search ................. 370/230, 231, 370/235, 236, 252, 386, 389, 392, 393, 395, 396, 432, 470, 471, 473, 475, 509, 442, 486, 487, 489, 490, 474; 348/6, 7, 12, 13; 455/3.1, 4.1, 5.1

[56] References Cited

U.S. PATENT DOCUMENTS

| | | | |
|---|---|---|---|
| 5,303,234 | 4/1994 | Kou | 370/442 |
| 5,317,571 | 5/1994 | Marcel et al. | 370/103 |
| 5,355,368 | 10/1994 | Dore et al. | 370/95.3 |
| 5,426,636 | 6/1995 | Hiller et al. | 370/60 |
| 5,453,988 | 9/1995 | Clarke | 370/442 |
| 5,568,482 | 10/1996 | Li et al. | 370/471 |
| 5,608,730 | 3/1997 | Osakabe et al. | 370/471 |
| 5,712,853 | 1/1998 | Mathur et al. | 370/395 |
| 5,712,982 | 1/1998 | Marcel | 370/442 |
| 5,799,003 | 8/1998 | Fujimaki et al. | 370/395 |

OTHER PUBLICATIONS

Glade M et al: "BISDN in the subscriber loop using a passive optical network" 5$^{TH}$ Conference on Optical/Hybrid Access Networks. Conference Proceedings (CAT. No. 93TH0542–1), Proceedings of 5$^{th}$ Conference on Optical Hybrid Access Networks, Montreal, Que., Canada, Sep. 7–9, 1993, pp. 6.02/01–6, XP002074291 ISBN 0–7803–1249–X, 1992, New York, NY, USA, IEEE, USA, see p. 6.02.02, line 34–p. 6.02.04, line 3; fig. 1, see p. 6.02.05, line 8–p. 6.02.06, line 5; fig. 3.

Voorde Van De I et al; "Full Service Optical Access Networks: ATM Transport on Passive Optical Networks" IEEE Communications Magazine, vol. 35, No. 4, Apr. 1997, pp. 70–75, XP000693606, see p. 71, col. 2, line 10–line 25; figure 3.

(List continued on next page.)

Primary Examiner—Ricky Ngo
Attorney, Agent, or Firm—Lyon & Lyon LLP

[57] ABSTRACT

Functional definitions and data transmission protocols are provided for both downstream and upstream OAM data flows in an ATM-based point-to-multipoint broadband access network ("BAN"), such as a passive optical network ("PON"). In particular, B-ISDN OAM functions are defined from an "OAM flow" perspective, wherein some of the PON physical layer related functions are performed at the F1 level flow, including all functions relating to the sign-on, ranging, power tuning, synchronization and timing status of the ONUs. F3 flow level functions are defined to include further performance and fault management functions, as well as MAC related functions, concerning mainly upstream and for upstream bandwidth management transactions between the headend facility and the respective ONUs. The F1 and F3 OAM data flows are transported in respective downstream frames and upstream packets in preferred protocols suitable for a point-to-multipoint network configuration. In particular, downstream F1 OAM flows are carried in specifically allocated overhead of each downstream frame header, with a downstream F1 "flow unit" defined as the entire frame. Downstream F3 OAM flows may be alternately carried in either the framing overhead, or in overhead associated with specific downstream ATM slots, with a downstream F3 flow unit defined as the respective ATM slots. Upstream F1 and F3 data flows are carried in specifically allocated overhead associated with each upstream packet.

17 Claims, 5 Drawing Sheets

OTHER PUBLICATIONS

Gillespi A et al.: "Evolving Access Networks: A European Perspective" IEEE Communications Magazine, vol. 35, No. 3, Mar. 1997, pp. 47–54, XP000687078, see p. 53, col. 1, line 2–line 35; fig. 7.

Angelopoulos J. D. et al: "A TDMA Based Access Control Scheme for APON's" Journal of Lightwave Technology, vol. 11, No. 5/06, May 1, 1993, pp. 1095–1103, XP000396737* section II.B*.

Access to B–ISDN Via PONS: ATM Communication in Practice, edited by Ulrich Killat, pub. by Wiley and Teubner, 1996, pp. I–XX, 1–308.

"Integrated Services Digital Network (ISDN) ISDN User–Network Interfaces—BISDN User–Network Interface—Layer Specification, " ITU–T Recommendation 1.432, (Mar. 1993), International Telecommunication Union, pp. i, 1–36.

"Integrated Services Digital Network (ISDN) Maintenance Principles–B–ISDN Operation and Maintenance Principles and Functions," ITU–T Recommendation I.610, (Nov. 1994), International Telecommunication Union, pp i, 1–46.

"Generic Requirement for Operations of ATM Network Elements (Nes)," *Bellcore,* Generic Requirements GR–1248–CORE, Issue 2, Sep. 1995, pp. ii–xiv, 1–17–7, Appendix, References, Glossary, Acronyms.

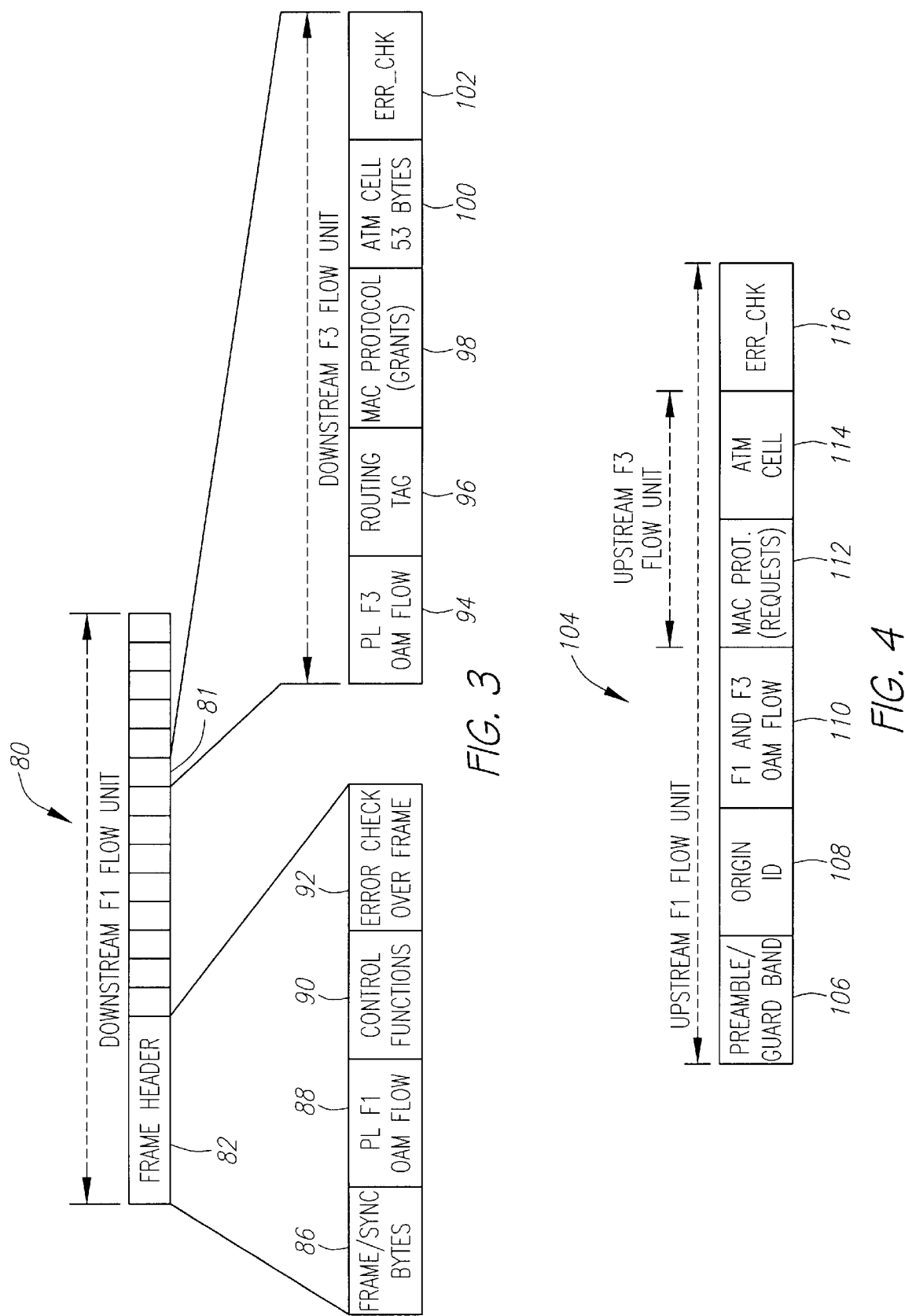

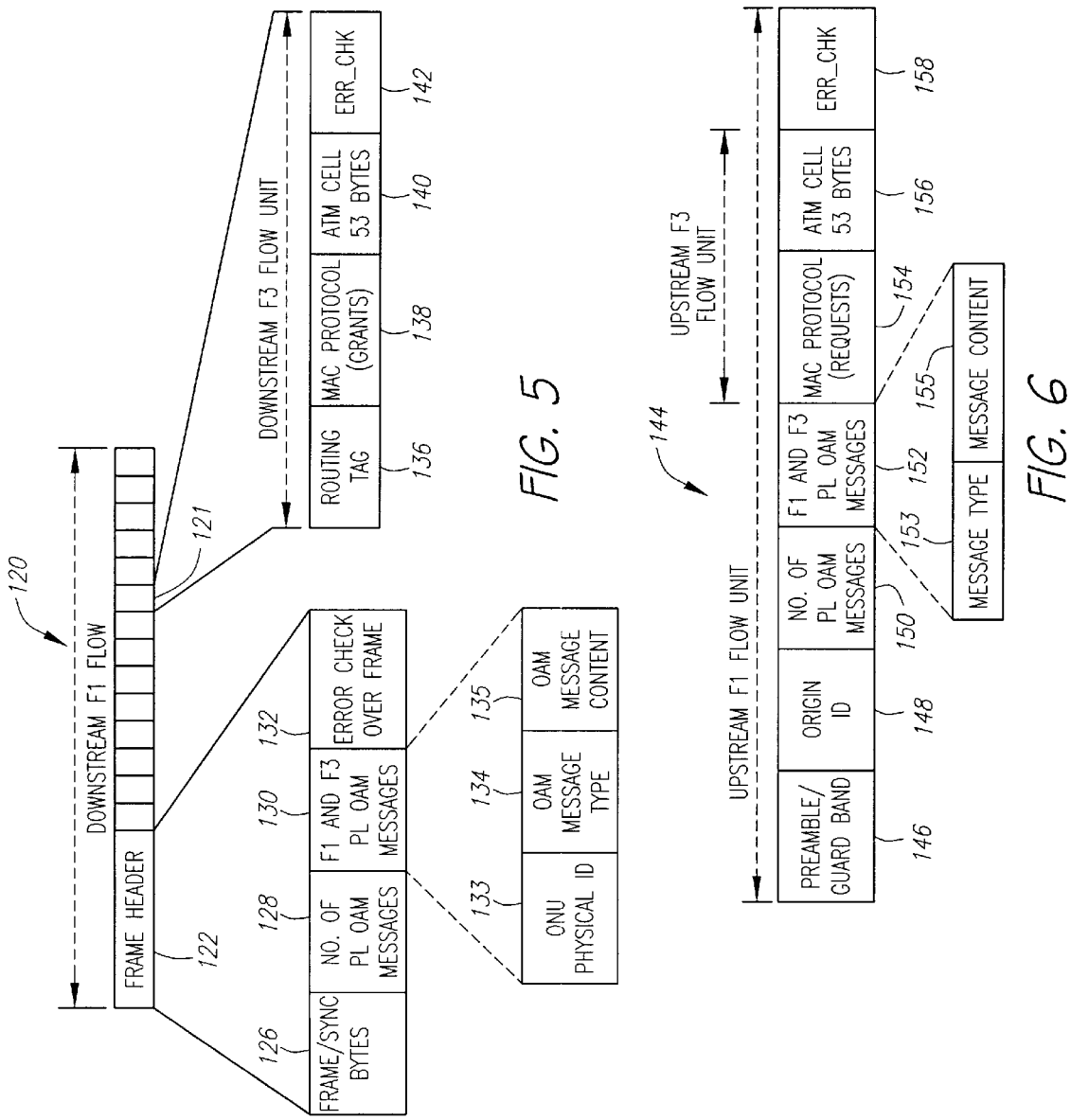

OPERATIONS AND MAINTENANCE DATA FLOWS OVER A POINT TO MULTIPOINT BROADBAND ACCESS NETWORK

FIELD OF THE INVENTION

The present invention pertains to the field of communication networks and, more particularly, to transmission protocols for the transport of operations, administration and maintenance data over a point-to-multipoint broadband access network.

BACKGROUND OF THE INVENTION

Much activity is presently being directed towards the design and deployment of "point-to-multipoint" broadband access networks, wherein downstream signals are broadcast from a single head-end facility to multiple end user stations (i.e., via "point-to-multipoint" transmission), and upstream signals are transmitted from each respective end user to the head end facility (i.e., via "point-to-point" transmission). It presently anticipated that point-to-multipoint broadband access networks will be employed to support a variety of independent communication services, such as traditional two-way telecommunications, broadcast video (i.e., CATV) services and a full range of digital baseband services.

Given the wide variety of potential communication services to be supported over point-to-multipoint broadband access networks, it is desirable to provide efficient digital data transmission protocols for supporting both the downstream and upstream communication paths. Notably, such networks are well suited to support asynchronous transfer mode ("ATM") based data transmission, whereby data packets or "cells" are periodically assembled and transmitted from a sending node, and received and disassembled at a receiving node. In particular, ATM transmission enables the transmission of multiple services over a single communication path, whereby individual service bandwidth utilization may be optimized as a function of the statistical activity of each individual service.

By way of specific examples, a preferred system architecture and data transmission protocol for a point-to-multipoint broadband access network employing an ATM-based passive optical network ("PON") is disclosed and described in U.S. Application Ser. No. 08/826,633, filed Apr. 3, 1997, entitled "Data Transmission Over a Point-to-Multipoint Optical Network," now U.S. Pat. No. 5,926,478. A preferred system architecture and data transmission protocol for a point-to-multipoint broadband access network employing a shared coaxial medium is disclosed and described in U.S. application Ser. No. 08/772,088, filed Dec. 19, 1996, entitled "Network Architecture for Broadband Data Communication Over a Shared Medium," now U.S. Pat. No. 5,926,476. Both of these applications are assigned to the assignee of the present application and both are fully incorporated herein by reference.

The use of a relatively low noise, high speed point-to-multipoint optical network to support the two-way transmission of a wide variety broadband data services is especially desirable in that relatively large amounts of data may be transported in short time periods. However, in order to fully utilize the high speed, low noise environment provided by an optical network, the selected data transmission protocol(s) should be compatible with existing optical transmission standards, should most fully utilize the available carrier channel bandwidth, and should conform with applicable ATM transmission protocols.

In addition to the efficient and successful delivery of bearer information, such communication protocols must also account for the efficient and successful delivery of "system level" data, including what is commonly referred to as operations, administration and maintenance ("OAM") data. In particular, OAM functions are generally categorized into performance, fault, configuration, accounting, security and traffic management data.

For example, OAM functions needed in an ATM-based point-to-multipoint PON can be categorized by looking at the protocols chosen for data transfer, the physical equipment related functions, the functions required, and the services supported over the access network. A general categorization of the OAM functions, based on a "protocol stack" view of a PON system, is set forth as follows:

1. Physical layer:
   (a) Optical layer, including transmit and receive power levels, ranging, synchronization, optical signal loopback, signal detection and frame alignment; and
   (b) PON transmission convergence, including cell slot and frame integrity, downstream frame and cell loopback, upstream cell loopback, error monitoring, cell rate de-coupling, cell delineation, performance monitoring, and fault localization.
2. ATM layer:
   (a) ATM cell integrity, flow control, traffic congestion control, and service priority identification ("PTI") and processing;
   (b) Virtual path ("VP") alarm indication signals ("AIS"), remote defect indication ("RDI"), continuity check, forward performance monitoring, backward performance monitoring, loopback, system management functions, and fault and performance management; and
   (c) Virtual circuit ("VC") AIS, RDI, continuity check, forward performance monitoring, backward performance monitoring, loopback, system management functions, and fault and performance management.
3. Media Access control ("MAC") functions:
   (a) Downstream bandwidth allocation and maintenance, upstream transmission bandwidth request processing, polling and sign-on of idle optical network units ("ONUs"); and
   (b) Upstream bandwidth requests based on traffic demand from each respective ONU, request grant identification and proper association with the upstream cell slot.
4. ATM Adaptation Layer ("AAL") level:
   (a) User data at this level is beyond the scope of the PON management; and
   (b) System signalling data is carried over AAL and is to be managed at the AAL level.
5. Service Level:
   This is transparent to PON the interface and concerns only end-points and intermediate points that process each particular service type.
6. Hardware alarms:
   (a) Equipment failures affecting the physical, MAC, and/or ATM layers; and
   (b) Internal failures, such as power or battery failures, backplane, board and component failures, and mechanical and environmental failures.

A generally accepted standard for OAM flows in broadband access networks is published in the ITU-T Recommendation 1.610 (draft published November 1995), entitled "B-ISDN Operation and Maintenance Principles and Functions," which is fully incorporated herein by reference. In accordance with the ITU-T 1.610 Recommendation, OAM functions in a broadband integrated services digital network (i.e., "B-ISDN OAM functions") are divided into the following stages: (1) performance monitoring, including the continuous or periodic monitoring of all network managed entities to verify their normal operation, resulting in maintenance event information; (2) defect and failure detection, including the detection of malfunction conditions through a continuous or periodic inspection, resulting in maintenance or alarm reports; (3) system protection, including minimizing of managed entity failure effects by blocking or replacing the entity—i.e., excluding the failed entity from further operation; (4) delivery of failure or performance impairment information to network management entities, e.g., such as alarm indication and status report delivery; and (5) fault localization, including internal or external testing to determine the impaired entity for fault localization.

In accordance with the ITU-T 1.610 Recommendation, B-ISDN OAM functions are essentially performed over five hierarchical "levels" associated with the ATM and physical layers of the protocol reference model, resulting in corresponding bidirectional "information flows" F1, F2, F3, F4 and F5, referred to herein as "OAM flows." Not all five hierarchical OAM flows F1–F5 must necessarily be employed in a particular network implementation—e.g., the OAM functions of a missing level may be performed at the next higher level. More particularly, the OAM flows F1–F5 constitute a means for in-band communication of information between peer OAM elements and functions of the broadband network, which collectively monitor the data path at different network levels. The transfer mode used for the information carried by these flows depends on the nature of both the particular level and the transport network.

By way of examples, for a physical layer based on the CCITT standard synchronous digital hierarchy ("SDH"), F1 to F3 flows are carried in synchronous channels in the overhead of the physical layer. For a cell-based physical layer, F1 to F3 flows are carried by physical layer OAM ( "PL-OAM") cells. For the ATM layer itself, the F4 flows are carried in cells distinguished by pre-assigned virtual circuit identifiers ("VCIs") in the virtual path, and the F5 flows are carried in cells distinguished by special PTI codes in the virtual circuit.

Existing industry standards addressing broadband OAM functionality are mainly directed to point-to-point backbone networks. Such networks, however, are fundamentally different from broadband access network architectures, and in particular, from point-to-multipoint networks. For example, while the data flows in a point-to-multipoint broadband access network are bidirectional, they are asymmetrical. As such, OAM flows in a point-to-multipoint broadband access network must be separately defined for "downstream" (i.e. from a head-end facility to the respective subtending terminals) and "upstream" (i.e., from the respective subtending terminals to the head-end facility) directions. Further, these OAM flows must be implemented through different mechanisms, carry different functions, and pertain to different end-points in each direction. In this context, the head-end and the subtending terminals are not peer entities, e.g., the terminals must report back fault conditions and performance degradation to the head-end, but the opposite is not applicable.

Thus, it would be desirable to define and provide specific OAM flow protocols for a broadband access network environment and, by way of example, show how such definitions and protocols would be applicable in a PON-based, point-to-multipoint broadband access network configuration.

SUMMARY OF THE INVENTION

The present invention provides both functional definitions and data transmission protocols for both downstream and upstream OAM data flows in an ATM-based point-to-multipoint broadband communication network.

In accordance with a first aspect of the invention, B-ISDN OAM functions in a point-to-multipoint PON-based broadband access network ("BAN"), are defined from an "OAM flow" perspective, wherein some of the PON physical layer related functions are performed at the F1 level flow, including all functions relating to the sign-on, ranging, power tuning, synchronization and timing status of the ONUs; certain physical layer performance, fault and configuration management; physical layer loopback testing; and equipment related status, failure, inventory and testing reports.

At the F3 flow level, the OAM functions are defined to include further performance and fault management functions, as well as MAC related functions. These functions concern mainly upstream and for upstream bandwidth management transactions between the headend facility and the respective ONUs.

In an exemplary point-to-multipoint PON, downstream data over is broadcast (or multicast) in successive downstream frames from an optical line terminal ("OLT") to a plurality of ONUs, wherein each downstream data frame generally comprises a framing header followed by a plurality of successive downstream ATM slots. Upstream data is transmitted point-to-point from respective ONUs to the OLT in packets, with each upstream packet including a header added to a standard ATM cell.

In accordance with a further aspect of the invention, the F1 and F3 OAM data flows are transported in the respective downstream frames and upstream packets in preferred protocols suitable for a point-to-multipoint network configuration. In particular, downstream F1 OAM flows are carried in specifically allocated overhead of each downstream frame header, with a downstream F1 "flow unit" defined as the entire frame. Downstream F3 OAM flows may be alternately carried in either the framing overhead, or in overhead associated with specific downstream ATM slots. In either case, a downstream F3 flow unit is defined as the respective ATM slots.

Upstream F1 and F3 data flows are carried in specifically allocated overhead associated with each upstream packet, with an upstream F1 flow unit defined as the entire upstream packet, and an upstream F3 flow unit defined as the upstream ATM cell and MAC layer overhead. In accordance with a still further aspect of the invention, the respective downstream and upstream F1 and F3 data flows may be cell-based, wherein the respective flows are transported in customized downstream and upstream ATM cells—i.e., with no overhead allocation required.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which:

FIG. 3 depicts a first preferred protocol for downstream F1 and F3 OAM flows in a frame-based ATM transmission scheme;

FIG. 4 depicts a first preferred protocol for upstream F1 and F3 OAM flows in a packet-based ATM transmission scheme corresponding to the downstream scheme of FIG. 3;

FIG. 5 depicts a second preferred protocol for downstream F1 and F3 OAM flows in a frame-based ATM transmission architecture;

FIG. 6 depicts a second preferred protocol for upstream F1 and F3 OAM flows in a packet-based ATM transmission scheme corresponding to the downstream scheme of FIG. 5;

DETAILED DESCRIPTION OF THE INVENTION

Figure 1:
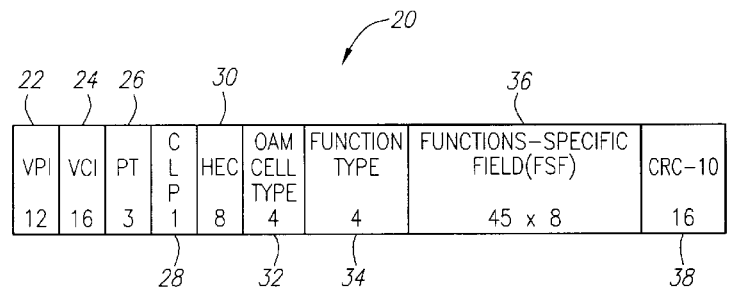
FIG. 1 depicts a Bellcore recommended OAM cell format for F4 and F5 OAM data flows.

In accordance with a general aspect of the present invention, another characterization of B-ISDN OAM functions in a broadband access network, such as a point-to-multipoint PON, may be set forth from an "OAM flow" perspective, instead of the standardized "protocol stack" perspective presented in the ITU-T 1.610 Recommendation.

In this regard, some of the PON physical layer related functions are preferably modeled as being performed at the F1 level flow. The F1 flow is the logical choice for system initialization OAM functions, including power up and sign-on of remotely located ONUs, ranging, and provisioning of downstream and upstream bandwidth, since it would be the first level of system management to be set-up.

In particular, OAM functions at the F1 flow level are preferably modeled as including:

(1) sign-on of ONUs, including terminal (logical) network ID allocation, parameter configuration, ranging, and power tuning;

(2) ranging, i.e., determining and compensating for the physical transmission distance of newly signed-on ONUs;

(3) synchronization and timing status of the ONUs;

(4) power tuning, i.e., adjusting an ONU's power level upon sign-on, and in service ramp-up of ONU transmit power levels;

(5) physical layer performance management, including monitoring the PON for physical layer degraded performance, i.e., based on the bit-error-rate ("BER"), RF power level, etc.;

(6) physical layer fault management, including detection and reporting of loss of signal ("LOS"), loss of frame ("LOF"), (AIS), (RDI), remote failure indication ("RFI"), reporting excessive forward error correction ("FEC") failures, and loss of F1 PL-OAM cell recognition;

(7) configuration management, including configuration of the physical layer and operational parameters of the PON system, and especially those at the ONUS;

(8) physical layer loopback testing;

(9) equipment related status reports, such as power mode and battery status of an ONU, and configuration procedure, such as commands for an ONU to shutdown or reset;

(10) equipment failure reports, including board and component level reports;

(11) inventory reports, including status reports on whether certain boards are equipped or unequipped, or are in-service or out-of-service, commands to delete boards and commands to report inventory information, e.g., date, version, serial #, type, etc.; and

(12) testing, including self test, report of self test results and battery test.

At the F3 flow level, the OAM functions are preferably modeled as including:

(1) performance management, including monitoring out of frame ("OOF") condition threshold to report any loss of frame ("LOF"), keeping counts on degraded error performance and incorrigible and erroneous headers, monitoring parameters of the data transfer protocol, and keeping counts on HEC violation of ATM cells so that when a threshold is exceeded, a loss of cell delineation ("LCD") fault condition is reported;

(2) fault management, including detecting and reporting of failures because of performance degradation exceeding pre-defined thresholds, the failure of insertion or suppression of IDLE cells, and loss of F3 PL-OAM recognition; and (3) MAC related functions, e.g., for when a respective ONU is signed on, ranged, or receiving downstream framed data. These functions concern mainly upstream and for upstream bandwidth management transactions between the headend facility and the respective ONUs.

As will be appreciated by those skilled in the art from the above-defined F1 and F3 flow definitions, F2 flows are not required in a PON-based broadband access network as defined herein, but instead the physical layer OAM functionality is carried in the F1 and F3 flows, as defined above. Preferably, OAM functions at the F4 and F5 flow levels for a PON-based broadband access network are defined analogously to those set forth in Bellcore's "Generic Requirements for Operations of ATM Network Elements (NEs)" (Issue 2—September 1995), which is fully incorporated herein by reference.

In particular, the Bellcore standard OAM cell format for F4 and F5 flows includes cells to affect the following functions:

(1) performance management, i.e., segment and end-to-end performance monitoring (forward monitoring, backward reporting), performance monitoring activation and reporting, and traffic management;

(2) fault management, including generation and exchange of messages reporting AIS and RDI, continuity checking, OAM cell loopback, alarm surveillance, fault localization and testing, and protection switching;

(3) activation and deactivation of OAM cells to do performance monitoring and continuity checking;

(4) system management, as specified by the system designer to perform internal functions;

(5) configuration management, i.e., functions to achieve external updates of the network status, memory updates, database query support, database backup and restoration, and software download support; and (6) security management to ensure system integrity; and (7) accounting/billing management procedures.

By way of example, a Bellcore recommended OAM cell format 20 is shown in FIG. 1, and includes a twelve bit virtual path identifier field 22, a sixteen bit virtual path field 24, a 3 bit payload type identifier field 26, a one bit cell loss priority field 28, a one byte HEC field 30, a four bit (OAM) function type field 34, forty-five bytes of function-specific information 36, and a two byte CRC field 38.

Figure 2:
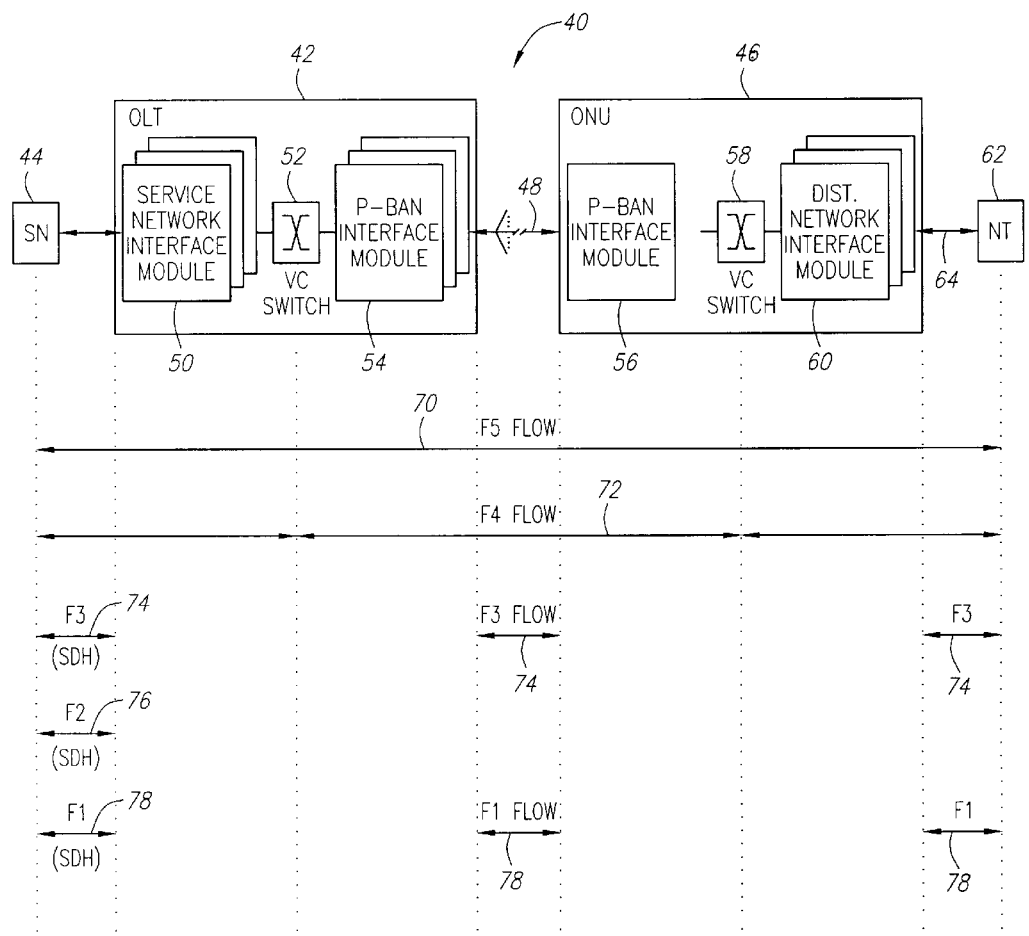
FIG. 2 depicts a basic assignment of F1 through F5 OAM flows through an exemplary PON-based broadband access network.

Referring to FIG. 2, an exemplary preferred PON-based broadband access network ("P-BAN") 40 includes an optical line terminal ("OLT") 42 linked to a wide area network service node 44, wherein the OLT 42 transmits and receives data to and from a plurality of remotely located optical network units ("ONUs") 46 via a point-to-multipoint optical distribution network 48. (For ease in illustration, only a single ONU 46 is depicted in FIG. 2).

In particular, the OLT 42 transmits and receives ATM data packets to and from the service node 44, respectively, via a plurality of service network interface modules 50. Within the OLT 42, the respective upstream and downstream data packets are switched between the service network interface modules 50 and a plurality of P-BAN interface modules 54 via an ATM virtual circuit switch 52.

Downstream data flow over the point-to-multipoint PON 48 is frame-based—i.e., downstream data is broadcast (or multicast) in successive downstream frames from the respective P-BAN interface modules 54 at the OLT 42 to a corresponding P-BAN interface module 56 located at each ONU 46. As described in greater detail in conjunction with the remaining drawings, each downstream data frame generally comprises a framing header followed by a plurality of successive downstream ATM slots, wherein each downstream ATM slot carries a standard fifty-three byte ATM cell addressed to a respective ONU, or grouping of ONUs.

In the upstream direction (i.e., from the respective ONUs 46 to the OLT 42), the data flow is packet-based, with each upstream packet including a header (and possibly a trailer) added to a standard ATM cell. In a manner described in the previously incorporated U.S. patent application Ser. No. 08/826,633, now U.S. Pat. No. 5,926,478, downstream and upstream transmission rates are not symmetric and upstream transmission bandwidth over the P-BAN 40 is allocated and controlled by the OLT 42, such that the respective ONUs 46 transmit successive upstream PON packets to the OLT 42 without interference. Notably, although there is no explicit framing structure for the upstream traffic, the traffic coming back upstream on the PON 48 as seen at the OLT 42 can be considered as part of "virtual frame," e.g., with a frame period that is based on a standard telephony 8 KHz rate—i.e. with a 125 usec frame interval timing.

Within each ONU 46, the upstream and downstream ATM data packets are switched between the P-BAN interface module 56 and a plurality of distribution network interface modules 60, via a virtual circuit mux 58. In a manner described in the previously incorporated U.S. patent application Ser. No. 08/772,088, now U.S. Pat. No. 5,926,476, the respective distribution network interface modules 60 each transmit and receive the data packets to and from, respectively, a plurality of network terminals ("NTs") 62 over a respective point-to-multi-point coaxial distribution network 64.

Taking a "local" view of the P-BAN 40 as a system, all OAM flows over the P-BAN 40 can be said to originate "somewhere" in the service node 44 and are bidirectional by definition. As for the termination of the OAM flows, there are basically three configurations: (1) ATM termination and AAL processing at an ONU 46; (2) ATM termination and AAL processing at an NT 62; and (3) ATM termination and AAL Processing at terminal equipment (not shown) located further downstream of the NTs 62.

There are two basic types of OAM flows at the ATM VC level: segment flow and end-to-end flow. The F5 flow identifies the virtual channel level. By definition, an end-to-end F5 flow extends between network elements performing virtual channel connection termination functions. Thus, for the P-BAN 40, the F5 flow 70 originates at the service node 44 and terminates at the respective NTs 62, i.e., at the point where ATM VCs are terminated. The F4 flow identifies the virtual path ("VP") level. In particular, F4 flows extends between network elements performing virtual path termination functions, i.e., between elements where ATM VP trails are terminated. Thus, for P-BAN 40, F4 flows 72 extend between at the service node 44 and the service network interface side of the OLT VC switch 52; between the P-BAN interface side of the OLT VC switch 52 and the P-BAN interface side of the ONU VC mux 58; and between the distribution network interface side of the ONU VC mux and the respective NTs 62.

Physical layer OAM (i.e., "PL-OAM") F3 through F1 flows must also be defined. The interface between the service node 44 and OLT 42 is an SDH interface and, thus, the respective F3, F2 and F1 flows 74, 76 and 78 between those network elements are preferably according to the standard definitions. In accordance with the present invention, F3 and F1 flows 74 and 78 between the OLT 42 and respective ONUs 46 are described in greater detail below in conjunction with the remaining drawings. Notably, there is no F2 flow. Preferably, the F3 and F1 flows 74 and 78 are carried by PL-OAM flows between the respective distribution network interface 60 and NT 62—again, with no intermediate F2 flow—, depending on the modality of the distribution network 64.

Note that these OAM flows may require modification if other system functions were required. By way of example, F1 flow would be interrupted and segmented to two pieces over the PON 48 if there were a signal regenerator.

Since all OAM flows are by definition bidirectional, they must be defined for both the upstream and downstream data flow directions. Because the PON 48 is a point-to-multipoint physical architecture, the defined downstream and upstream OAM flows will necessarily be asymmetrical, i.e. they will not be identical for the downstream and upstream directions in that they would be implemented through different mechanisms, carry different functions, and pertain to different end points.

Notably, an OAM flows is by definition a selected functional grouping. Thus, there need not be symmetrical downstream and upstream OAM data flows so long as all of the functions relevant to the system architecture of the PON 48 are accounted for and implemented. All upstream OAM flows in the P-BAN 48 will be point-to-point, i.e. between the particular ONU 46 transmitting upstream traffic and the OLT 42.

As for downstream flows, it depends on whether the specific connections are point-to-point or multicast/broadcast. Preferably, all downstream F1 flow 78 is point-to-multipoint. However, in the case of point-to-point connections from the OLT 42 to particular ONUs, the F5, F4 and F3 flows 70, 72 and 74 are point-to-point. For multicast (or broadcast) connections from the OLT 42 to multiple (or all) ONUs 46, the respective F5, F4 and F3 flows 70, 72 and 74 are point-to-multipoint.

On the other hand, it is possible to model a multicast group of ONUs 46 as one "set", and hence multicast F5, F4 and F3 flows 70, 72 and 74 may also be point-to-point to a particular group, whereby respective fault conditions relevant to that "set" are lumped together.

As will be apparent from the present disclosure to those skilled in the art, the purpose of modeling OAM flows in P-BAN 40 is to identify how to correlate fault conditions at different points over the P-BAN 40 to the specific OAM flows involved in those fault conditions. In the case of both downstream and upstream point-to-point flows, such correlation is obvious. But even with asymmetrical flows (i.e., downstream point-multipoint versus and upstream point-point), fault conditions may still be correlated to the affected OAM flow.

By way of example, feedback on fault conditions occurring downstream and detected at an ONU 46 comes back to the OLT 42 on upstream OAM flows, which are point to point. Hence, fault localization and diagnostics are possible through correlating alarms reported on upstream flows to the relevant downstream flows. Fault conditions occurring on an upstream flow are detected at the OLT 42. Of course, having the OLT 42 report back to a fault condition to an ONU 46 may not be applicable, especially for the PL-OAM flows (i.e., F1 and F3 flows 78 and 74). For F4 and F5 flows 72 and 70, however, such feedback would be applicable, since the termination points for the respective F4 and F5 flows 72 and 70 extend beyond the ONUs 46.

In accordance with a general aspect of the invention, the F3 and F1 OAM flows 74 and 78 over the PON 48 may be defined in terms of the downstream framing and cell structure and the upstream cell structure.

In particular, referring to FIG. 3, a first preferred downstream data frame 80 includes a header 82, followed by a plurality of ATM slots 81. The frame header 82 includes: a framing field 86 containing one or more framing synchronization bytes; an OAM F1 flow field 90 for transporting physical layer F1 OAM messages to all ONU 46 recipients of the frame 80; a control function field 90 for further control messages from the directed to the ONUs 46 from the OLT 42 (i.e., for sign-on, ranging, power tuning, etc.); and an error check (e.g., CRC) information field 92.

Each downstream ATM slot 81 includes an OAM F3 flow field 94 for transporting physical layer F3 OAM messages directed to a specified ONU 46 (or to a specified grouping of ONUs, if the ATM slot 81 is multicast to more than one ONU); an ONU routing tag field 96 to identify the recipient ONU(s) 46 of the ATM slot 81; a MAC layer message field 98 used by the OLT 42 for allocating and controlling upstream packet transmission "grants" to the respective ONUs 46; a fifty-three byte ATM cell 100; and an error check information field 102.

In accordance with an aspect of the present invention, the downstream F1 OAM "flow unit" of the exemplary protocol in FIG. 3 is defined to encompass the downstream frame 80—i.e., the F1 information carried in field 88 pertains to the entire downstream frame 80. The downstream F3 OAM flow unit is defined as each ATM slot 81—i.e., the F3 information carried in field 94 of each ATM slot 81 pertains to the entire respective slot.

Internal virtual path (VP) and virtual circuit (VC) addressing fields (not shown) are included in each ATM cell 100, as provided for with conventional ATM standards. As will be appreciated by those skilled in the art, use of the ONU routing tag 96 allows for preserving VP/VC address space within the ATM cell 100, as well as providing simplified routing and filtering of ATM cells 100 at the ONUs 46.

Alternately, it may be possible to affect the above functions without an explicit ONU routing tag 96 added to each ATM slot 81. For example, a subset of ATM VPs or VCs could be reserved for each ONU 46, which could be used as a routing tag. The main advantage of this alternate approach is that it results in an easier implementation as the VC switch 52 in the OLT 42 can be made to perform the "tagging" and the PON interface subsystem 54/56 would be relieved of that function. A drawback to this approach, however, is that during sign-on, each ONU 46 would have to be made to recognize its ATM VP/VC based ONU-ID before the ONU physical layer is configured by the OLT 42. This would also result in reducing the total address space of VP/VC combinations.

Referring to FIG. 4, a first preferred upstream ATM packet 104 includes a preamble/guard band 106; an originating ONU ID field 108; an OAM field 110 for transporting physical layer F1 and F1 OAM messages from the originating ONU 46 (i.e., identified in field 108) to the OLT 42; a MAC layer message field 112 used by the respective transmitting ONU 46 for transmitting upstream bandwidth "requests" and traffic load status information to the OLT 42; a fifty-three byte ATM cell 114; and an error check information field 116.

In accordance with a further aspect of the present invention, the upstream F1 OAM flow unit of the exemplary protocol in FIG. 4 is defined to encompass the upstream ATM packet 104, and the upstream F3 OAM flow unit is defined as the respective MAC layer message field 112 and ATM cell 114.

Referring generally to FIGS. 2–4, in all OAM flows over PON 48, fault and error conditions in the downstream are reported in the return upstream flow, if such feedback is possible. There are error conditions where the ONUs 46 cannot transmit upstream or should not do so anyway, e.g. upon detecting a LOS (Loss Of Signal) condition. As will be appreciated by those skilled in the art, a fault condition occurring at a certain layer of OAM flow affects the respective layer(s) above it and how that fault is reported to a fault management application residing within a network management system (not shown) located at the OLT 42. Further, although F1 and F3 fault and error conditions seen in the upstream flow at the OLT 42 are not reported back to the respective ONU 46 associated with the condition, VP and VC messages are preferably to be exchanged between the OLT 42 and ONUs 46 on a peer-to-peer basis.

One of the physical layer fault messages that is needed for both F1 and F3 flows is an RDI, which is reported back to the OLT 42 when a defect has been detected at an ONU 46. The persistence of a defect is defined a "failure", and an RFI is another fault message reported from the ONUs 46 to the OLT 42. This would basically be a time integrated condition.

An AIS message, in the strict definition of the term, would not apply in PON 48, since the end-points of the PL-OAM flows are the respective OLT 42 and ONUs 46. An "AIS" message for F1 and F3 flow could be used to indicate to the ONUs 46 that the OLT 42 has experienced physical layer failures. The "AIS" indications downstream from the OLT 42 to the ONUs 46 could be "explicit" (i.e. through a message defined for this purpose) or "implicit" (e.g. turning off downstream transmission).

Moreover, notifications of physical facility degradations or failures from the OLT 42 to the ONUs 46 could also be handled through the fault manager application, wherein the OLT 42 would relay commands from the fault manager to the ONUs to perform whatever actions it deems necessary in case of service affecting physical layer degradations or failures.

The function of the performance monitoring message carried in the upstream F1 flow is to report on excessive un-correctable errors on the downstream frame 80, resulting in an FEBE ("Far End Block Error"). The definition of the "block" for F1 flow downstream would be the sub-frame over which the frame protection field 92 is computed. The F3 performance monitoring message would be an "F3 FEBE", reporting that a "block error" has been detected. For downstream F3 flow, that block would be the error correction field 102 and the HEC field of the ATM cell 100, and so an HEC field or error check field 102 violation detected at the ONU 46 is reported back to the OLT 42 as a "Downstream Cell Slot FEBE".

Notably, with the preferred protocols depicted in FIGS. 3 and 4, the OLT 42 can only transmit F3 OAM messages to an ONU 46 receiving downstream payload traffic, i.e. wherein the ONU 46 has previously been processed through an upstream bandwidth request/permit cycle at the OLT 42. Further, although the downstream F1 OAM messages are conveyed in the downstream frame header 82 and, thus, can be processed by any ONU 46, they cannot be addressed to a particular GNU 46.

An alternate approach to implement F1 and F3 flows over the PON 48 is to define an OAM message structure destined to a particular ONU 46 and composed of an ONU-ID, a message type and a message content. This could be done for fault, performance and even configuration management.

More particularly, referring to FIG. 5, a second preferred downstream data frame 120 includes an alternately configured frame header 122, followed by a plurality of alternately configured ATM slots 121. The frame header 122 includes a framing field 126 containing one or more framing synchronization bytes; a first OAM field 128 for identifying a number of physical layer F1 and F3 OAM messages carried in a second OAM field 130; and an error check information field 132.

The respective physical layer F1 and F3 messages carried in field 130 are each comprised of a specified ONU ID field 133 for identifying the recipient ONU 46 of the particular message; a message type field 134 indicating whether the particular message contains F1 or F3 information, as well as its priority level and the nature of message; and a message content field 135.

Each downstream ATM slot 121 includes an ONU routing tag field 136 to identify the recipient ONU(s) 46 of the ATM slot 121; a MAC layer message field 138 used by the OLT 42 for allocating and controlling upstream packet transmission grants to the respective ONUs 46; a fifty-three byte ATM cell 140; and an error check information field 142. In contrast to the first exemplary downstream ATM slots 81, because the F3 messages are carried in the frame header 122, no corresponding field is required in the individual ATM slots 121.

As with the exemplary protocol of FIG. 3, in accordance with the present invention, the downstream F1 OAM flow unit of the exemplary protocol in FIG. 5 is defined to encompass the downstream frame 120, and the downstream F3 OAM flow unit is defined as each ATM slot 121.

Referring to FIG. 6, a preferred upstream ATM packet 144 corresponding to the downstream frame 120 includes a preamble/guard band 146; an originating ONU ID field 148; a first OAM field 150 for identifying a number of physical layer F1 and F3 OAM messages carried in a second OAM field 152; a MAC layer message field 154 used by the respective transmitting ONU 46 for transmitting upstream bandwidth requests and traffic load status information to the OLT 42; a fifty-three byte ATM cell 156; and an error check information field 158.

The respective physical layer F1 and F3 messages carried in field 152 are each comprised of a message type field 153 indicating whether the particular message contains F1 or F3 information, as well as its priority level and the nature of message; and a message content field 155. Unlike in the downstream frame 120, no ONU ID field is required for the upstream messages 152, since they are all to be received by the OLT 42.

Again, a with the exemplary protocol of FIG. 4, in accordance with the present invention, the upstream F1 OAM flow unit of the exemplary protocol in FIG. 6 is defined to encompass the entire upstream ATM packet 144, and the upstream F3 OAM flow unit is defined as the respective MAC layer message field 154 and ATM cell 156.

Notably, while the respective downstream and upstream F1 and F3 OAM messages primarily pertain to fault and performance management, they can also be defined and used for system configuration management—e.g., for ONU sign-on, set-up and initialization, setting up default connections for downloading configuration tables, and for "fast control" messages. Thus, part of the control function of the PON 48 could be carried by the F1 and F3 PL-QAM message flow.

An advantage of the alternate preferred frame protocol 120/144 is that the OLT 42 can send OAM information to any ONU 46 that is synchronized to the downstream frame timing and is in a state where it recognizes a "iphysical ID". It need not be the recipient of any downstream ATM traffic to receive the aAM information.

Of course, with this implementation, the ONU-ID field 133 within the each PL-OAM message 130 will have to be processed by each ONU 46 on a message-by-message basis. Thus, the message number field 128 is needed so that the ONUs 46 will know the position where the error check field 132 starts. Likewise, because the upstream packets 144 may contain varying numbers of OAM messages 152, the upstream message number field 150 is needed so that OLT 42 will know the position where the MAC layer field 154 starts.

Figure 7:
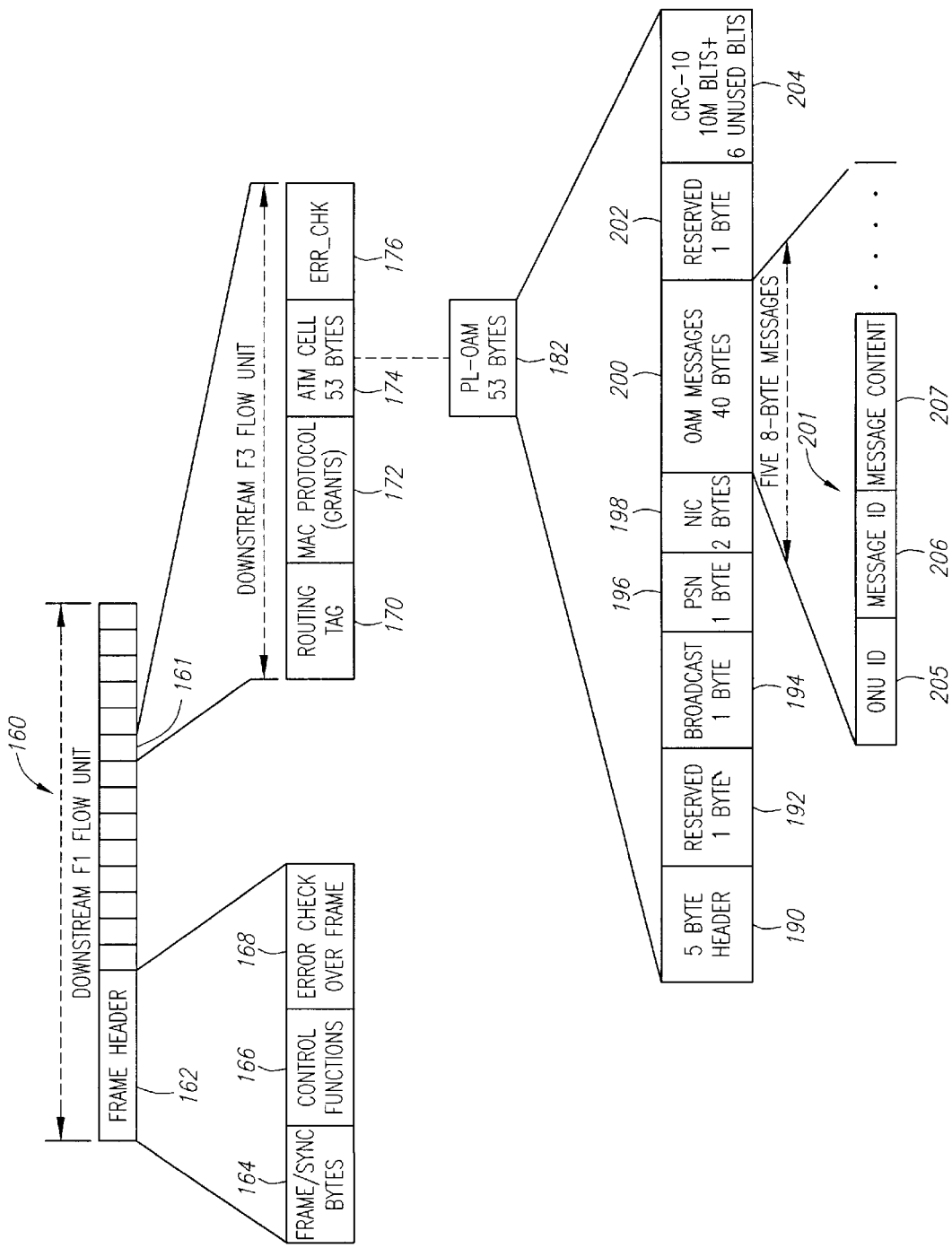
FIG. 7 depicts a third preferred protocol for downstream F1 and OAM flows in a frame-based ATM transmission architecture.
Figure 8:
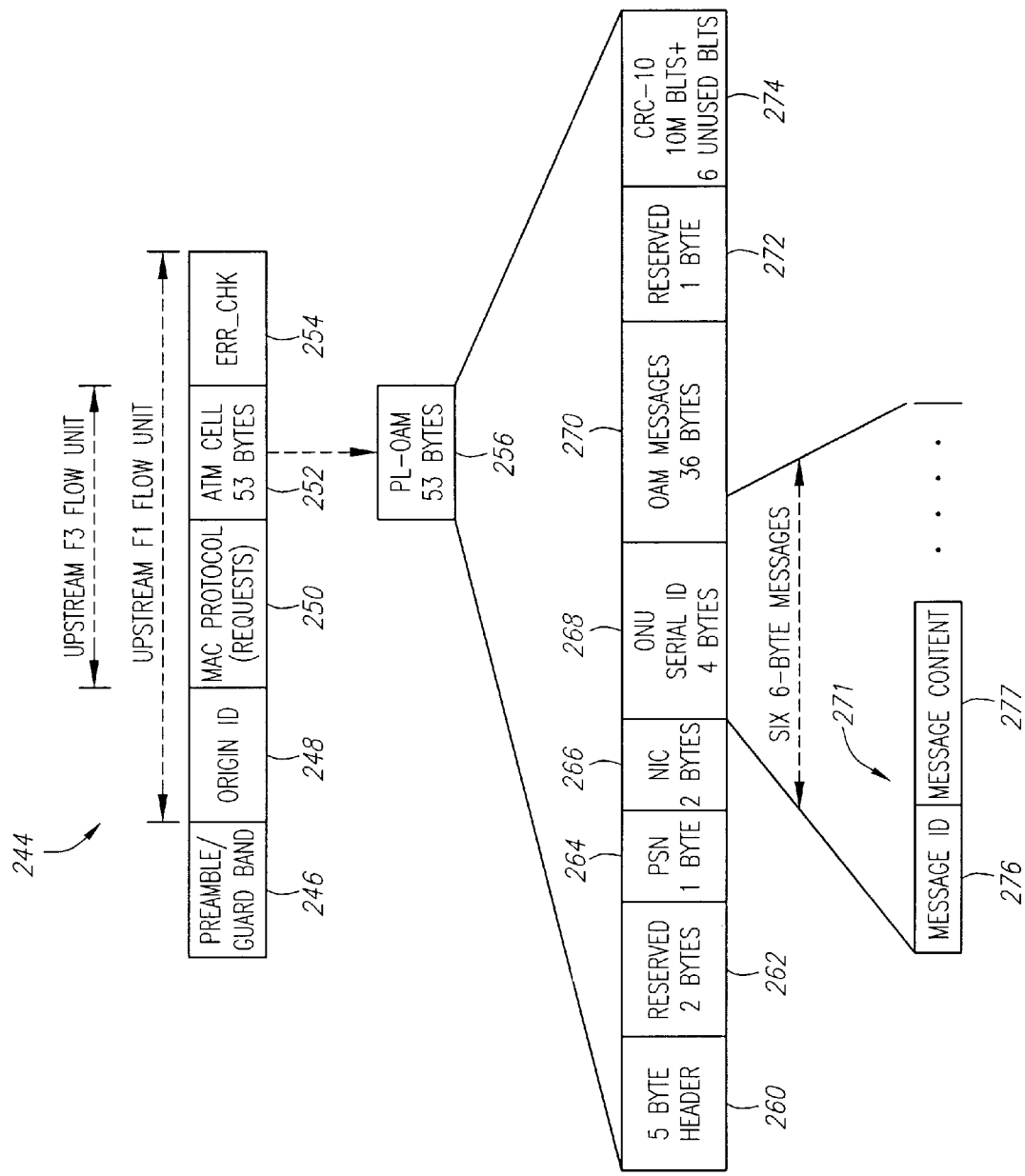
FIG. 8 depicts a third preferred protocol for upstream F1 and F3 OAM flows in a packet-based ATM transmission scheme corresponding to the downstream scheme of FIG. 7.

Referring to FIGS. 7 and 8, in a still further alternate preferred protocol, instead of allocating framing and ATM slot "overhead" for transporting the respective the downstream and upstream F1 and F3 CAM flows, "customized" ATM cells are employed.

In particular, a third preferred downstream data frame 160 includes a frame header 162, followed by a plurality of ATM slots 161. There is no use of frame header overhead for CAM flow transport. As such, the frame header 162 includes a framing field 164 containing one or more framing synchronization bytes; a control function field 166 for control messages from the directed to the ONUs 46 from the OLT 42; and an error check information field 168. Each downstream ATM slot 161 includes an ONU routing tag field 170; a MAC layer message field 172 for allocating and controlling upstream packet transmission grants; a fifty-three byte ATM cell 174; and an error check information field 176.

In accordance with a this aspect of the invention, periodic downstream ATM cells 174 are used only to transport physical layer F1 and F3 OAM messages. In such an "OAM ATM cell" 182, a first, five byte header 190 is used to identify whether the cell contains F1 or F3 OAM information—i.e., in the space normally reserved for VCI/VPI information. In a presently preferred embodiment, the F1 and F3 identifying codes are those set forth in the ITU-T I.432 standard, wherein the first three bytes (or "octets") are set to all zeros for either F1 or F3. For F1 cells, the last two bytes are set to 00000011 and 01011100; for F3 cells, the last two bytes are set to 00001001 and 01101010.

The identifying header 190 is followed by a reserved byte field 192; a one byte broadcast identifier field 194 to identify whether an OAM cell is destined to all ONUs 46 (i.e., encoded as all ones if broadcast and all zeros if not); a one byte PL-OAM sequence number ("PSN") field 196, which indicates the order of a particular PL-OAM cell (182) in a sequence of cells, and is designed to have a sufficiently large cycle (i.e., up to 256) compared with the duration of cell loss and insertion; a two-byte "number of included cells (NIC)" field 198, indicating the number of cells (up to 512) between the previous and present F1 PL-OAM cell; a forty byte OAM message field 200; a further reserved byte 202; and a two-byte error check (CRC) field 204.

In particular, the OAM message field 200 carries five eight-byte messages 201, each message 201 comprising a specified ONU ID field 205 for identifying the recipient ONU 46 of the particular message 201; a message ID field 206 identifying the priority level and the nature of message; and a message content field 207.

As will be apparent to those skilled in the art, the bandwidth within the body of the downstream PL-OAM ATM cells 182 could be used in alternate configurations. For example, an HDLC link could be established over all or part of the body of these cells 182, or a protocol stack similar to SDH/SONET Section and Line DCC channels could be established. An advantage of a message based interface, however, is that it is simple to implement, extendable and fits the functions required at the physical layer.

All physical layer functions are supported through this cell-based transport protocol. Examples of these functions include sign-on, (coarse, static and dynamic) ranging, configuration of physical layer settings (default frequencies, power levels, etc.), as well as OAM information flow between the OLT 42 and the ONUs 46.

Referring to FIG. 8, a preferred upstream ATM packet 244 corresponding to the downstream frame 160 includes a preamble/guard band 246; an originating ONU ID field 248; a MAC layer message field 250 used by the respective transmitting ONU 46 for transmitting upstream bandwidth requests and traffic load status information to the OLT 42; a fifty-three byte ATM cell 252; and an error check information field 254.

As with the downstream direction, periodic upstream ATM cells 252 are used only to transport physical layer F1 and F3 OAM messages. In such an upstream OAM ATM cell 256, a first, five byte header 260 is used to identify whether the cell contains F1 or F3 OAM information. In a presently preferred embodiment, the F1 and F3 identifying codes are the same as those used in the downstream direction (described above). The identifying header 260 is followed by a reserved byte field 262; a one byte PSN field 264; a two-byte NIC field 266; a four byte ONU serial ID field 268 for identifying the address of the respective transmitting ONU 46; a thirty-six byte OAM message field 270; a further reserved byte 272; and a two-byte error check (CRC) information field 274.

The upstream OAM message field 270 carries six six-byte messages 271, each message 271 comprising a message ID field 276 identifying the priority level and the nature of message; and a message content field 277. Again, since all upstream ATM packets 244 are destined for the OLT 42, no "ONU ID" field is required in the upstream messages 271. Also again, as will be apparent to those skilled in the art, the bandwidth within the body of the upstream PL-OAM ATM cells 256 could be used in alternate configurations.

As with the preferred protocol of FIG. 3, the downstream F1 OAM "flow unit" of the exemplary protocol in FIG. 7 is still defined to encompass the downstream frame 160, with the downstream F3 OAM flow unit defined as each ATM slot 161.

With reference to each of the foregoing preferred message-based OAM transmission protocols shown in FIGS. 3–8, exemplary downstream F1 flow messages include those for sign-on ID allocation, sign-on parameter configuration, ranging parameter adjust, power tuning adjustment and in-service physical layer parameter adjustment. Further examples of downstream F1 flow messages include loopback commands, change of power mode command, shutdown/reset command, self test command, request test results, request battery status, report excessive BER command, report excessive error check failure, request report on equipment/transmitter/receiver status and failure, trunk condition port commands, and service removal and restoration commands.

Examples of upstream F1 flow messages include messages for "sign-on ID acknowledge", physical layer parameter degradation indication, F1 fault management, and F1 performance management. Other examples of upstream F1 flow messages include a response to loopback command, report of self test results, report of battery status, response to status request on excessive BER, report of frame error check failures, response to request of equipment/transmitter/receiver status, autonomous self failure report, and a report that a board is un-equipped or out of service.

Examples of downstream F3 flow messages include commands to report loss of cell delineation defects and failures, commands to report violations in an error check field, commands to report number of cells discarded, commands to clear counter of number of cells discarded, commands to report cells discarded due to header errors, and commands to clear counter on cells discarded due to header errors.

Examples of upstream F3 flow messages include messages for MAC requests expansion, F3 fault management, F3 upstream performance management, additional upstream bandwidth request based on traffic service class, response to commands to report loss of cell delineation defects and failures, response to commands to report number of cells discarded, and response to commands to report number of cells discarded due to header errors.

Of course, not all the foregoing exemplary downstream and upstream F1 and F3 OAM messages need to be used in a preferred network implementation and still further messages not included may also be used. The examples are provided to help emphasize a preferred usage of the foregoing protocols.

While embodiments and applications of preferred data transmission protocols and implementations for OAM flows in a point-to-multipoint broadband access network have been shown and described, as would be apparent to those skilled in the art, many modifications and applications are possible without departing from the inventive concepts herein.

Thus, the scope of the disclosed inventions is not to be restricted except in the spirit of the appended claims.

What is claimed:

1. A communication system, comprising:

a headend node; and a plurality of network units in communication with the headend node over a point-to-multipoint access network, wherein the headend node is configured to transmit downstream data in successive downstream frames to the network units, each downstream frame comprising a frame header including a field reserved for a first defined OAM flow, each downstream frame further comprising a plurality of downstream payload slots, each downstream payload slot comprising a downstream slot header including a field reserved for a second defined OAM flow, wherein the first defined OAM flow is associated with the entire downstream frame and the second defined OAM flow is associated with the respective downstream payload slots.

2. The communication system of claim 1, wherein the network units are configured to transmit upstream data in respective upstream payload slots to the headend node, each upstream payload slot comprising an upstream payload slot header including a field reserved for both first and second defined OAM flows.

3. The communication system of claim 2, wherein the upstream payload slot header further includes a MAC protocol layer field and an ATM cell, and wherein the first defined OAM flow is associated with the entire upstream payload slot and the second defined OAM flow is associated with the respective MAC protocol layer field and ATM cell.

4. The communication system of claim 1, wherein the point-to-multipoint network is an optical network, and wherein the first defined OAM flow includes physical layer functions relating to the sign-on, ranging, power tuning, synchronization and timing status of the network units.

5. The communication system of claim 4, wherein the first defined OAM flow further includes functions relating to physical layer performance, fault and configuration management, physical layer loopback testing, and equipment related status, failure, inventory and testing reports.

6. The communication system of claim 4, wherein the second defined OAM flow includes MAC protocol layer related functions.

7. A communication system, comprising:

a headend node; and a plurality of network units in communication with the headend node over a point-to-multipoint access network, wherein the headend node is configured to transmit downstream data in successive downstream frames to the network units, each downstream frame comprising a frame header including a field reserved for OAM messages, wherein the OAM messages may include messages of a first defined OAM flow, or messages of a second defined OAM flow, or both, each downstream frame further comprising a plurality of downstream payload slots, wherein the first defined OAM flow is associated with the entire downstream frame and the second defined OAM flow is associated with the respective downstream slots.

8. The communication system of claim 7, wherein the network units are configured to transmit upstream data in respective upstream payload slots to the headend node, each upstream payload slot comprising an upstream payload slot header and an ATM cell, the upstream payload slot header including a field reserved for OAM messages, wherein the OAM messages may include messages of the first defined OAM flow, or messages of the second defined OAM flow, or both.

9. The communication system of claim 8, wherein the upstream payload slot header further includes a MAC protocol layer field, and wherein the first defined OAM flow is associated with the entire upstream payload slot and the second defined OAM flow is associated with the respective MAC protocol layer field and ATM cell.

10. The communication system of claim 8, wherein the respective downstream and upstream OAM messages each include a message type field and a message content field.

11. The communication system of claim 10, wherein the respective downstream messages each further include a network unit address field.

12. A communication system, comprising:

a headend node; and a plurality of network units in communication with the headend node over a point-to-multipoint access network, wherein the headend node is configured to transmit downstream data in successive downstream frames to the network units, each downstream frame comprising a frame header and a plurality of downstream payload slots, wherein periodic ones of the downstream payload slots comprise downstream OAM cells, each downstream OAM cell comprising a first field for identifying whether OAM messages contained in the respective downstream OAM cell are of a first defined OAM flow or a second defined OAM flow, wherein the first defined OAM flow is associated with the entire downstream frame and the second defined OAM flow is associated with the respective downstream payload slots.

13. The communication system of claim 12, wherein the downstream OAM cell further comprises a field for identifying whether the respective cell is being broadcast to all network units.

14. The communication system of claim 12, wherein the downstream OAM cell further comprises a field reserved for a plurality of downstream OAM messages, each message including a network unit address, a message type field and a message content field.

15. The communication system of claim 12, wherein the network units are configured to transmit upstream data in respective upstream payload slots to the headend node, each upstream payload slot comprising an upstream ATM cell, wherein periodic upstream ATM cells comprise up OAM cells, each upstream OAM cell comprising a first field for identifying whether OAM messages contained in the respective upstream OAM cell are of the first defined OAM flow or the second defined OAM flow.

16. The communication system of claim 15, wherein the upstream payload slots further include a MAC protocol layer field, and wherein the first defined OAM flow is associated with the entire upstream payload slot and the second defined OAM flow is associated with the respective MAC protocol layer field and ATM cell.

17. The communication system of claim 15, wherein the downstream OAM cell further comprises a field reserved for a plurality of upstream OAM messages, each message including a message type field and a message content field.

* * * * *